US012080218B2

(12) United States Patent
Yao et al.

(10) Patent No.: US 12,080,218 B2
(45) Date of Patent: Sep. 3, 2024

(54) DISPLAY DEVICE

(71) Applicant: Shenzhen China Star Optoelectronics Semiconductor Display Technology Co., Ltd., Shenzhen (CN)

(72) Inventors: Xiaohui Yao, Shenzhen (CN); Hua Fu, Shenzhen (CN); Zhida Xu, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/618,514

(22) PCT Filed: Nov. 16, 2021

(86) PCT No.: PCT/CN2021/130787
§ 371 (c)(1),
(2) Date: Dec. 13, 2021

(87) PCT Pub. No.: WO2023/077557
PCT Pub. Date: May 11, 2023

(65) Prior Publication Data

US 2024/0038131 A1 Feb. 1, 2024

(30) Foreign Application Priority Data

Nov. 8, 2021 (CN) .......................... 20211131436.4

(51) Int. Cl.
*G09G 3/36* (2006.01)
*G09G 3/20* (2006.01)

(52) U.S. Cl.
CPC ... *G09G 3/2092* (2013.01); *G09G 2310/0267* (2013.01); *G09G 2310/08* (2013.01); *G09G 2320/0233* (2013.01)

(58) Field of Classification Search
CPC ............................................. G09G 2300/0426
See application file for complete search history.

(56) References Cited

U.S. PATENT DOCUMENTS

| | | | | |
|---|---|---|---|---|
| 7,956,836 | B2 * | 6/2011 | Yamazaki ............ | G09G 3/3685 345/99 |
| 2021/0020134 | A1 * | 1/2021 | Park ..................... | G09G 3/3688 |

FOREIGN PATENT DOCUMENTS

| | | | |
|---|---|---|---|
| CN | 101916540 | A | 12/2010 |
| CN | 106991949 | A | 7/2017 |
| CN | 206848661 | U | 1/2018 |
| CN | 207038050 | U | 2/2018 |
| CN | 108564916 | A | 9/2018 |
| CN | 109243392 | A | 1/2019 |
| CN | 111240114 | A | 6/2020 |
| CN | 111445831 | A | 7/2020 |

(Continued)

*Primary Examiner* — Nan-Ying Yang
(74) *Attorney, Agent, or Firm* — Nathan & Associates; Menachem Nathan

(57) ABSTRACT

A display device is provided, including a circuit board, a display panel, a plurality of clock signal lines, and a plurality of grounding resistors. Each clock signal line extends from the circuit board to a non-display area of the display panel. The plurality of grounding resistors are disposed on the circuit board. Each grounding resistor is connected to a corresponding clock signal line, and is configured to reduce a voltage value of high level of the clock signal.

18 Claims, 4 Drawing Sheets

(56) References Cited

FOREIGN PATENT DOCUMENTS

| | | | |
|---|---|---|---|
| CN | 111583848 | A | 8/2020 |
| JP | 2000298457 | A | 10/2000 |
| JP | 2005084364 | A | 3/2005 |

* cited by examiner

DISPLAY DEVICE

FIELD OF DISCLOSURE

The present disclosure relates to the field of display technologies, and in particular to a display device.

BACKGROUND

As display technologies mature, an existing thin film transistor liquid crystal display device (TFT-LCD) has achieved a narrow bezel design and ultra-high resolution (e.g., 8K), and is developing toward higher performance, such as large size, high resolution, and high contrast.

However, existing ultra-high resolution display devices are prone to various display defects, such as black and white horizontal lines, image crosstalk, and afterimages. These undesirable defects seriously affect display quality of the display device and customer's viewing experience. The black and white horizontal lines are caused by a large in-plane load of the ultra-high resolution display device. As a size of the display device increases, the in-plane load also increases. Specifically, for clock signal lines that are designed to be driven line by line within a surface of the display device (such as, a display surface of the display panel), there is a significant load difference between clock signal lines arranged in different lines. The display device displays a desired image by controlling light emission of a plurality of pixels disposed in the plane. The load difference between the clock signal lines will result in a difference in the potential of the pixel after charging, which in turn leads to a difference in brightness between different pixel rows. Therefore, there are dense black and white horizontal lines in the displayed image.

At present, an improvement solution for the above-mentioned defects is to adjust the in-plane load difference between the clock signal lines by changing a manufacturing process. However, this improvement solution cannot completely solve the load difference between the clock signal lines, and easily leads to problems, such as a decrease in product yield, a decrease in production capacity, and a decrease in efficiency.

Accordingly, it is necessary to provide a display device to solve the problems in the prior art.

SUMMARY OF DISCLOSURE

In order to solve the above-mentioned problems of the prior art, a purpose of the present disclosure is to provide a display device, which can improve a problem of a display device showing unexpected black and white horizontal lines.

To achieve the above purpose, the present disclosure provides a display device, including a processor configured to output driving signals and voltages; a timing controller connected to the processor, and configured to generate control signals based on the driving signals; a circuit board connected to the timing controller, and configured to generate initial clock signals according to the voltages and the control signals, wherein the clock signal is a signal with high levels and low levels that occur alternatively; a display panel connected to the circuit board, and including a display area and a non-display area; a plurality of clock signal lines configured to transmit the initial clock signals, wherein each of the clock signal lines extends from the circuit board to the non-display area of the display panel; a plurality of grounding resistors disposed on the circuit board, wherein each of the grounding resistors is connected to a corresponding clock signal line, and is configured to reduce a voltage value of the high level of the initial clock signal to obtain an adjusted clock signal; a gate driver disposed in the non-display area of the display panel, connected to the clock signal lines, and configured to generate a gate signal according to the adjusted clock signal; and a gate line disposed in the display area of the display panel, connected to the gate driver, and configured to transmit the gate signal.

In some embodiment, the plurality of clock signal lines are arranged in sequence from the display area of the display panel toward the non-display area, and values of two of the grounding resistors connected to two of the clock signal lines are different.

In some embodiment, the display device includes a M-th clock signal line, a (M−1)th clock signal line, and a (M−2)th clock signal line arranged in sequence; and a value of the grounding resistor connected to the M-th clock signal line is R(M), a value of the grounding resistor connected to the (M−1)th clock signal line is R(M−1), and a value of the grounding resistor connected to the (M−2)th clock signal line is R(M−2), wherein $R(M)<R(M-1)<R(M-2)$ or $R(M)>R(M-1)>R(M-2)$.

In some embodiment, the display device includes a K-th clock signal line and a (K−1)th clock signal line which are adjacent to each other; and a value of the grounding resistor connected to the K-th clock signal line is R(K), and a value of the grounding resistor connected to the (K−1)th clock signal line is R(K−1), wherein $R(K)=R(K-1)$.

In some embodiment, the display device further includes a plurality of matching resistors disposed on the circuit board, wherein each of the matching resistors is connected to a corresponding clock signal line.

In some embodiment, each of the clock signal lines includes a first section and a second section connected to the first section, the first section is disposed in the circuit board, and the second section is disposed in the non-display area of the display panel, and each of the grounding resistors is connected to the first section of the corresponding clock signal line.

In some embodiment, the circuit board includes a first circuit board and a second circuit board; the first section of the clock signal line includes a first subsection and a second subsection, the first subsection is disposed on the first circuit board, and the second subsection is disposed on the second circuit board; the second section of the clock signal line includes a third subsection and a fourth subsection, which are respectively arranged on opposite sides of the display panel; the gate driver includes a first gate driver and a second gate driver, the first gate driver is connected to the third subsection, the second gate driver is connected to the fourth subsection, and the first gate driver and the second gate driver are respectively connected to opposite ends of the gate line; and each of the grounding resistors includes a first grounding resistor and a second grounding resistor, the first grounding resistor is disposed on the first circuit board and connected to the first subsection of the corresponding clock signal line, and the second grounding resistor is disposed on the second circuit board and connected to the second subsection of the corresponding clock signal line.

In some embodiment, the first grounding resistor and the second grounding resistor connected to a same clock signal line have a same value.

In some embodiment, the first grounding resistor and the second grounding resistor connected to a same clock signal line have different values.

In some embodiment, the clock signal line, RC circuits of the first grounding resistor and the second grounding resistor, and a RC circuit of a corresponding gate line constitute an electronic circuit.

The present disclosure also provides a display device, including: a circuit board configured to output clock signals, wherein the clock signal is a signal with high levels and low levels that occur alternatively; a display panel connected to the circuit board, and including a display area and a non-display area; a plurality of clock signal lines configured to transmit the clock signals, wherein each of the clock signal lines extends from the circuit board to the non-display area of the display panel; a plurality of grounding resistors disposed on the circuit board, wherein each of the grounding resistors is connected to a corresponding clock signal line, and is configured to reduce a voltage value of the high level of the clock signal; a gate driver disposed in the non-display area of the display panel, connected to the clock signal lines, and configured to generate a gate signal according to the clock signal that the voltage value of the high level is reduced; and a gate line disposed in the display area of the display panel, connected to the gate driver, and configured to transmit the gate signal.

In some embodiment, the plurality of clock signal lines are arranged in sequence from the display area of the display panel toward the non-display area, and values of two of the grounding resistors connected to two of the clock signal lines are different.

In some embodiment, the display device includes a M-th clock signal line, a (M−1)th clock signal line, and a (M−2)th clock signal line arranged in sequence; and a value of the grounding resistor connected to the M-th clock signal line is R(M), a value of the grounding resistor connected to the (M−1)th clock signal line is R(M−1), and a value of the grounding resistor connected to the (M−2)th clock signal line is R(M−2), wherein $R(M)<R(M-1)<R(M-2)$ or $R(M)>R(M-1)>R(M-2)$.

In some embodiment, the display device includes a K-th clock signal line and a (K−1)th clock signal line which are adjacent to each other; and a value of the grounding resistor connected to the K-th clock signal line is R(K), and a value of the grounding resistor connected to the (K−1)th clock signal line is R(K−1), wherein $R(K)=R(K-1)$.

In some embodiment, the display device further includes a plurality of matching resistors disposed on the circuit board, wherein each of the matching resistors is connected to a corresponding clock signal line.

In some embodiment, each of the clock signal lines includes a first section and a second section connected to the first section, the first section is disposed on the circuit board, and the second section is disposed on the non-display area of the display panel, and each of the grounding resistors is connected to the first section of the corresponding clock signal line.

In some embodiment, the circuit board includes a first circuit board and a second circuit board; the first section of the clock signal line includes a first subsection and a second subsection, the first subsection is disposed on the first circuit board, and the second subsection is disposed on the second circuit board; the second section of the clock signal line includes a third subsection and a fourth subsection, which are respectively arranged on opposite sides of the display panel; the gate driver includes a first gate driver and a second gate driver, the first gate driver is connected to the third subsection, the second gate driver is connected to the fourth subsection, and the first gate driver and the second gate driver are respectively connected to opposite ends of the gate line; and each of the grounding resistors includes a first grounding resistor and a second grounding resistor, the first grounding resistor is disposed on the first circuit board and connected to the first subsection of the corresponding clock signal line, and the second grounding resistor is disposed on the second circuit board and connected to the second subsection of the corresponding clock signal line.

In some embodiment, the first grounding resistor and the second grounding resistor connected to a same clock signal line have a same value.

In some embodiment, wherein the first grounding resistor and the second grounding resistor connected to a same clock signal line have different values.

In some embodiment, wherein the clock signal line, RC circuits of the first grounding resistor and the second grounding resistor, and a RC circuit of a corresponding gate line constitute an electronic circuit.

In comparison with the prior art, the present disclosure optimizes a circuit design of the clock signal lines and eliminate a load difference of the clock signal lines by setting the grounding resistors and the matching resistors connected to the clock signal lines on the circuit board of the display device, thereby solving the problem of unexpected black and white horizontal lines appearing on a display image, and a product yield and product quality are greatly improved.

BRIEF DESCRIPTION OF DRAWINGS

The following describes specific embodiments of the present disclosure in detail with reference to accompanying drawings to make technical solutions and other beneficial effects of the present disclosure obvious.

DETAILED DESCRIPTION

The technical solutions in the embodiments of the present disclosure will be clearly and completely described below in conjunction with the drawings in the embodiments of the present disclosure. Apparently, the described embodiments are only a part of the embodiments of the present disclosure, rather than all the embodiments. Based on the embodiments in the present disclosure, all other embodiments obtained by those skilled in the art without creative efforts shall fall within a protection scope of the present disclosure.

Figure 1:
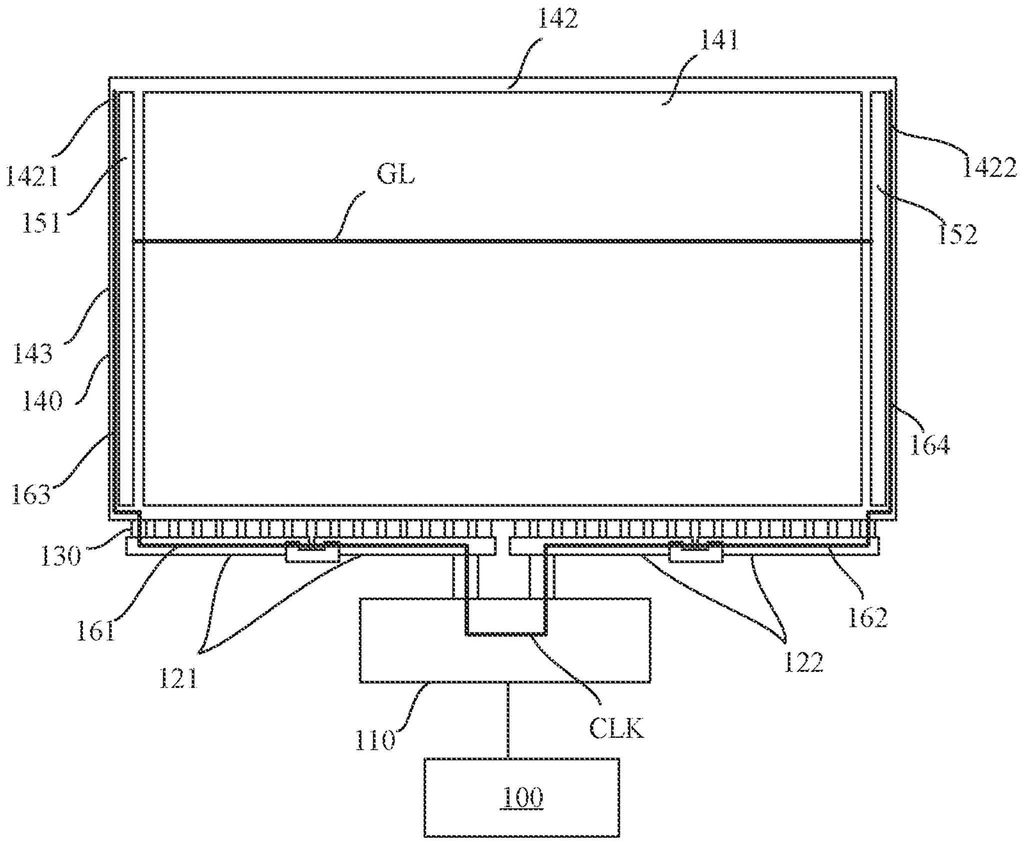
FIG. 1 shows a schematic diagram of a display device according to an embodiment of the present disclosure.

Referring to FIG. 1, which shows a schematic diagram of a display device 10 according to an embodiment of the present disclosure. The display device 10 includes a processor 100, a timing controller 110, a first circuit board 121, a second circuit board 122, flexible circuit boards 130, a display panel 140, a first gate driver 151, a second gate driver 152, and a source driver. The timing controller 110 is connected to the processor 100. The first circuit board 121 and the second circuit board 122 are connected to the timing controller 110, and are respectively connected to the display panel 140 through the corresponding flexible circuit boards 130. The display panel 140 includes a display area 141 and a non-display area 142 surrounding the display area 141. The first gate driver 151 and the second gate driver 152 are respectively disposed on opposite sides of the display panel 140, and arranged in the non-display area 142 between an outer periphery 143 and the display area 141 of the display panel 140. The source driver can be integrated in the first circuit board 121 and the second circuit board 122, integrated in the flexible circuit boards 130, or disposed in the non-display area 142 of the display panel 140, but it is not limited thereto. The display area 141 of the display panel 140 includes a plurality of gate lines GL, a plurality of data lines, and a plurality of pixels. Each gate line GL can drive at least one row of pixels. The first gate driver 151 and the second gate driver 152 are correspondingly connected to the gate lines GL, and are respectively connected to opposite ends of the gate line GL. The source driver is connected to the data lines.

Figure 2:
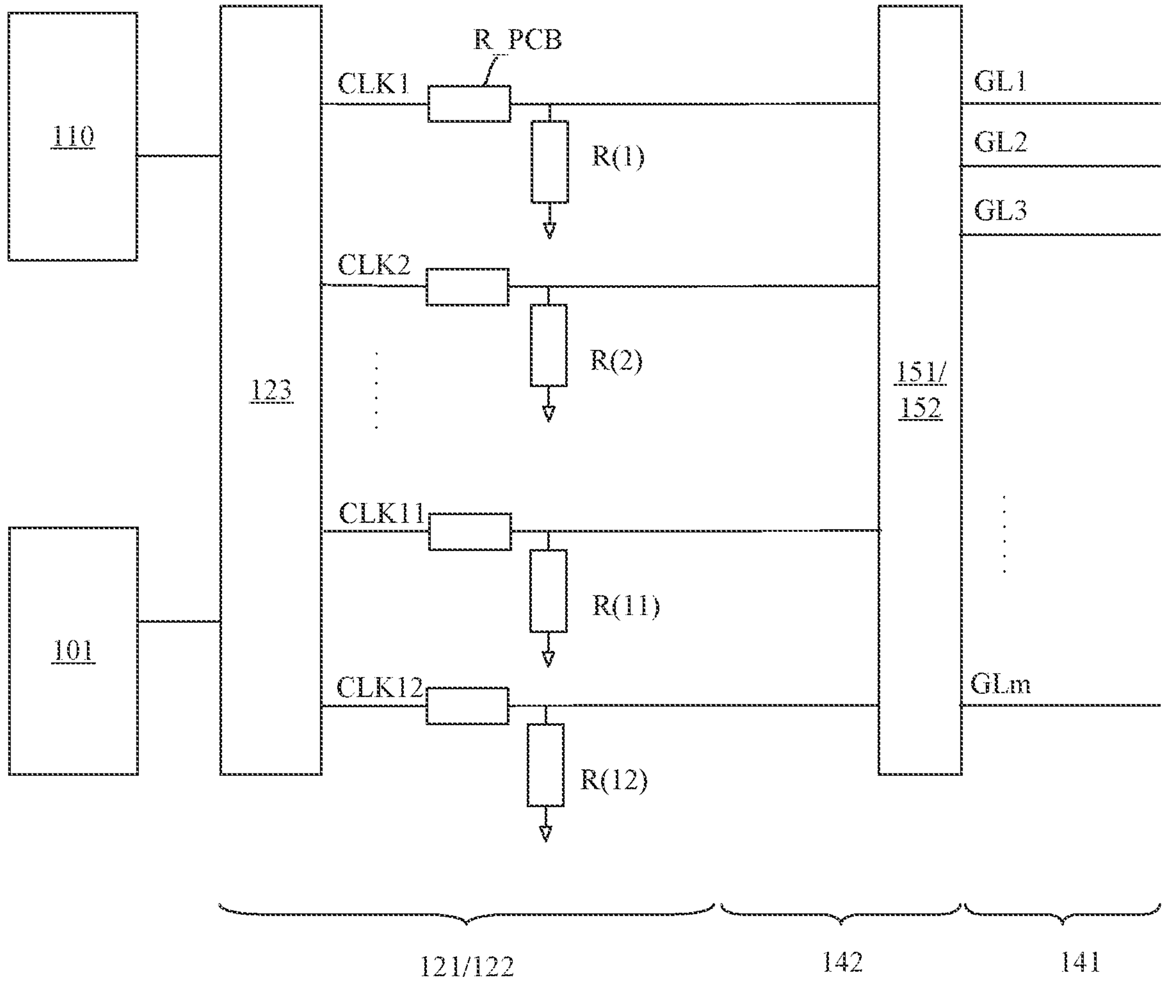
FIG. 2 shows a partial circuit block diagram of the display device of FIG. 1.

Referring to FIG. 1 and FIG. 2, FIG. 2 shows a partial circuit block diagram of the display device of FIG. 1. The display device 10 also includes a voltage generating unit 101 and a timing generating unit 123. In this embodiment, the voltage generating unit 101 may be disposed in the processor 100, and the timing generating unit 123 may be disposed in the first circuit board 121 and the second circuit board 122. The timing generating unit 123 is connected to the voltage generating unit 101 and the timing controller 110. The timing generating unit 123 is connected to the first gate driver 151 and the second gate driver 152 through a plurality of signal lines, such as clock signal lines CLK, a scanning start signal line, a scanning sequence control signal line, and so on. In this embodiment, the signal lines between the timing generating unit 123 of the first circuit board 121 and the first gate driver 151 include twelve clock signal lines (CLK1 to CLK12). The signal lines between the timing generating unit 123 of the second circuit board 122 and the second gate driver 152 also includes twelve clock signal lines (CLK1 to CLK12). It should be understood that other numbers of clock signal lines CLK may be used in other embodiments, and it is not limited thereto.

As shown in FIG. 1 and FIG. 2, in this embodiment, the processor 100 outputs driving signals, such as image signals, enable signals, vertical synchronization signals, horizontal synchronization signals, and clock signals. The timing controller 110 receives the above-mentioned driving signals from the processor 100. The timing controller 110 generates data control signals based on the driving signals. The source driver generates data signals according to the data control signals and outputs them to the corresponding data line. Furthermore, the voltage generating unit 101 provides voltages to the timing generating unit 123. The timing controller 110 generates control signals based on the driving signals. The timing generating unit 123 generates gate control signals including clock signals according to the voltages and the control signals, and controls the corresponding clock signal line CLK to transmit the clock signal to the first gate driver 151 and/or the second gate driver 152. The first gate driver 151 and the second gate driver 152 generate gate signals according to the gate control signals, and output to the corresponding gate line. The pixels in the display panel 140 display images in response to the data signals and the gate signals.

As shown in FIG. 1, the non-display area 142 of the display panel 140 includes a first wiring region 1421 and a second wiring region 1422. The first wiring region 1421 is arranged between the first gate driver 151 and the outer periphery 143 of the display panel 140, and the second wiring region 1422 is arranged between the second gate driver 152 and the outer periphery 143 of the display panel 140.

As shown in FIG. 1 and FIG. 2, each clock signal line CLK extends from the circuit board 121/122 to the wiring region 1421/1422 of the non-display area 142 of the display panel 140. Specifically, the same clock signal line CLK (such as, a first clock signal line CLK1) includes a first section disposed in the circuit board 121/122 and a second section disposed in the display panel 140. Since this embodiment adopts a dual gate driving technology, the same clock signal line CLK will extend on opposite sides of the display device 10.

As shown in FIG. 1, in one clock signal line CLK, the first section of the clock signal line CLK includes a first subsection 161 disposed on the first circuit board 121 and a second subsection 162 disposed on the second circuit board 122. The second section of the clock signal line CLK includes a third subsection 163 disposed on the first wiring region 1421 and a fourth subsection 164 disposed on the second wiring region 1422. The first subsection 161 and the second subsection 162 receive clock signals generated based on the same signal of the timing controller 110, that is, the first subsection 161 and the second subsection 162 are used to transmit the same clock signal. The first subsection 161 is connected to the third subsection 163, and the second subsection 162 is connected to the fourth subsection 164. The third subsection 163 is connected to the first gate driver 151, and the fourth subsection 164 is connected to the second gate driver 152. The first gate driver 151 and the second gate driver 152 control the same gate line GL based on the same clock signal.

Figure 3:
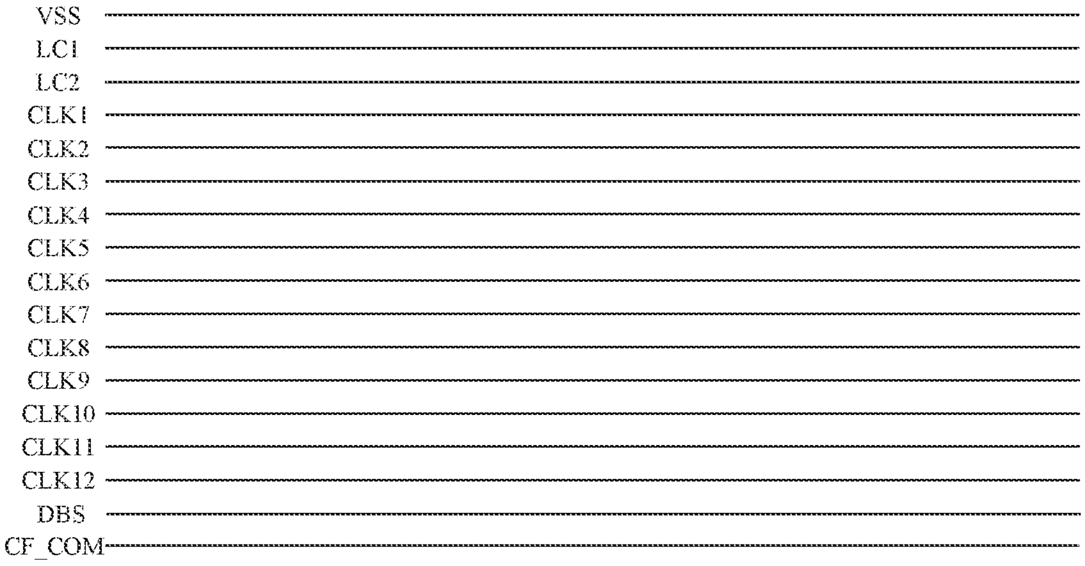
FIG. 3 shows a schematic diagram of a wiring region of a non-display area of a display panel of the display device of FIG. 1.

It should be noted that different clock signal lines CLK may have load differences due to panel manufacturing process differences, which will affect the clock signals transmitted to the display panel 140. Secondly, manufacturing process differences of the circuit board 121/122, design differences (e.g., structural design, wiring layout design, etc.) of the display panel 140 and the circuit board 121/122 will also cause the above-mentioned load difference problem. For example, refer to FIG. 3, which shows a schematic diagram of the wiring region 1421/1422 of the non-display area 142 of the display panel 140 of the display device of FIG. 1. In the wiring region 1421/1422 of the display panel 140, from the non-display area 142 (or the outer periphery 143) to the display area 141 of the display panel 140, a common electrode line CF_COM of a color filter substrate, a DBS (data line bm less) common electrode line DBS, a twelfth clock signal line CLK12 to the first clock signal line CLK1, a second pull-down circuit control signal line LC2, a first pull-down circuit control signal line LC1, and a reference potential line VSS are arranged in sequence. In the display panel 140, the clock signals of each clock signal line CLK are coupled with the surrounding signal lines. Due to the influence of the wiring design, different clock signals will cause different amounts of coupling, which in turn causes different loads between different clock signal lines. In order to improve the load difference between the clock signal lines, the display device of the present disclosure also includes the grounding resistors connected to the clock signal lines, as detailed below.

As shown in FIG. 1 and FIG. 2, the grounding resistors R are disposed on the circuit board 121/122 and connected to the first section of the corresponding clock signal line CLK. Specifically, refer to FIG. 4, which shows a circuit diagram of a clock signal line according to an embodiment of the present disclosure. The grounding resistor 1 connected to the same clock signal line CLK includes a first grounding resistor RL1 and a second grounding resistor RR1. The first grounding resistor RL1 is disposed on the first circuit board 121 and connected to the first subsection 161 of the clock signal line CLK. The second grounding resistor RR1 is disposed on the second circuit board 122 and connected to the second subsection 162 of the clock signal line CLK. The third subsection 163 of the clock signal line CLK carries a first load (including a first load resistance RL2 and a first load capacitance CL2) due to process differences and wiring layout. Similarly, the fourth subsection 164 of the clock signal line CLK carries a second load (including a second load resistor RR2 and a second load capacitor CR2). In addition, the gate line GL driven based on the same clock signals also carries a third load (including a third load resistor R3 and a third load capacitor C3). The same clock signal line CLK, the RC circuits of the first grounding resistor RL1 and the second grounding resistor RR1, and the corresponding RC circuit of the gate line GL constitute an electronic circuit. A current of the clock signal line CLK on the display panel is I1, a current of the clock signal line CLK on the first circuit board 121 is I2, and a current of the clock signal line CLK on the second circuit board 122 is I3. A total current I of the clock signal line CLK is I1+I2+I3.

Figure 5:
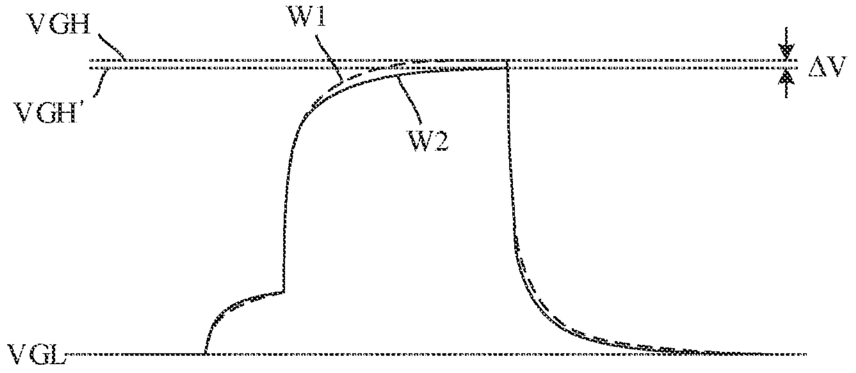
FIG. 5 shows a waveform diagram of a clock signal according to an embodiment of the present disclosure.

In this embodiment, by setting the grounding resistor R, a voltage drop of the clock signal can be enhanced, and a voltage value of high level of the clock signal can be reduced. Specifically, refer to FIG. 5, which shows a waveform diagram of a clock signal according to an embodiment of the present disclosure. The timing generating unit 123 generates an initial clock signals W1 according to the received voltages and the control signals from the timing controller 110, and transmits the initial clock signals W1 through a corresponding clock signal line CLK. The initial clock signal W1 is a signal with high levels VGH and low levels VGL that occur alternatively. The grounding resistor R connected to the clock signal line CLK can reduce a voltage value of the high level of the clock signal, thereby obtaining an adjusted clock signal W2. Specifically, the grounding resistor R can reduce a total resistance of the circuit and increase the total current I, which increases the voltage drop of the clock signals on the circuit board, thereby reducing the voltage value of the high level of the clock signal input to the display panel. In some embodiments, a difference ΔV between the high level VGH of the initial clock signal W1 and the high level VGH' of the adjusted clock signal W2 is about 0.375V. According to a feed-through effect, when a gate line of an N-th row is turned on, a gate line of an (N−1)th row is turned off. At this time, pixel electrodes in the (N−1)th row will reduce a driving voltage due to the influence of a parasitic capacitance, and thus a brightness of pixels in the (N−1)th row will be darkened. In the present disclosure, by setting the grounding resistors R, the driving voltage drop caused by the feed-through effect can be reduced, and a brightness of pixels corresponding to a dark area can be improved. Therefore, the problem of black and white horizontal lines caused by the load difference between the clock signal lines CLK is eliminated, thereby improving an image quality.

In the present disclosure, the grounding resistors R are disposed on the circuit board 121/122 instead of the wiring region 1421/1422 of the display panel 140. Therefore, the grounding resistors R can be prevented from occupying a wiring space of the display panel 140, and the grounding resistors R can be prevented from increasing a load of the display panel 140.

It should be noted that a value of the grounding resistor R is determined according to a wiring position of the clock signal line connected to it. In this embodiment, considering the difference in wiring positions of different clock signal lines, the value of the grounding resistor R ranges from 1 to 500 kiloohms (KΩ). It should be understood that if the value of the grounding resistor R exceeds this range, a normal display of the panel will be affected, or it will have little effect on eliminating the black and white horizontal lines. If the value of the resistance is too large (for example, greater than 500 KΩ), due to a circuit principle, an impact on the clock signals in the display panel will be small, and the effect of eliminating the black and white horizontal lines will not be improved. On the other hand, if the value of the resistance is too small (for example, less than 1 KΩ), the clock signal line in the display panel will be short-circuited due to the circuit principle, which will affect the display.

In some embodiments, the display device 10 includes the plurality of clock signal lines arranged in sequence from the non-display area 142 to the display area 141 of the display panel 140. By designing values of two of the grounding resistors corresponding to at least two of the clock signal lines to be different, the load difference caused by the different wiring positions of the clock signal lines can be eliminated. For example, the display device 10 includes N clock signal lines arranged in sequence from the outer periphery 143 to the display area 141 of the display panel 140. A value of the grounding resistor connected to an N-th clock signal line is R(N), and a value of the grounding resistor connected to the first clock signal line is R(1), where R(N)≠R(1).

In some embodiments, the display device 10 includes N clock signal lines arranged in sequence from the outer periphery 143 to the display area 141 of the display panel 140. Since the wiring difference between two adjacent clock signal lines is relatively small, values of two adjacent grounding resistors R corresponding to the two adjacent clock signal lines are designed to be the same. For example, the display device 10 includes a K-th clock signal lines and an adjacent (K−1)th clock signal line, where N≤K<1. A value of the grounding resistor connected to the K-th clock signal line is R(K), and a value of the grounding resistor connected to the (K−1)th clock signal line is R(K−1), where R(K)=R (K−1). It should be noted that R(K)≠R(N) or R(K)≠R(1). Part of the grounding resistors R is designed with the same resistance value, which is beneficial to reduce a manufacturing complexity of the circuit board 121/122, and improve a yield and productivity.

In some embodiments, the display device 10 includes the plurality of clock signal lines arranged in sequence from the outer periphery 143 to the display area 141 of the display panel 140. Because different clock signal lines have different manufacturing process differences, and different clock signals will have different coupling values due to a cascade relationship, the grounding resistors R corresponding to the plurality of clock signal lines can be designed to be totally or mostly different in value. In response to the different values of the grounding resistors R, the values can be set in an orderly or disorderly manner, where solutions the ordered manner include gradual changes. Specifically, the values of the grounding resistors R gradually change from the outer periphery to the display area, such as gradually increasing or decreasing. For example, the display device 10 includes N clock signal lines arranged in sequence from the outer periphery 143 to the display area 141 of the display panel 140, including a M-th clock signal line, a (M−1)th clock signal line, and a (M−2)th clock signal line which are arranged in sequence, and N≤M<1. A of the grounding resistor connected to the M-th clock signal line is R(M), a value of the grounding resistor connected to the (M−1)th clock signal line is R(M−1), and a value of the grounding resistor connected to the (M−2)th clock signal line is R(M−2), where R(M)<R(M−1)<R(M−2) or R(M)>R(M−1)>R (M−2). In some embodiments, the values of the grounding resistors R are an arithmetic sequence with a tolerance of 1 KΩ. For example, the grounding resistors R connected to the first clock signal line CLK1 to the twelfth clock signal line CLK12 are respectively 1 KΩ, 2 KΩ, 3 KΩ, 4 KΩ, 5 KΩ, 6 KΩ, 7 KΩ, 8 KΩ, 9 KΩ, 10 KΩ, 11 KΩ, and 12 KΩ. All or most of the grounding resistors R are designed with different resistance values, which has a better effect on improving of black and white horizontal lines.

In some embodiments, the first grounding resistor RL1 and the second grounding resistor RR1 of the grounding resistor R connected to the same clock signal line CLK can be designed to be the same (for example, the value of the above grounding resistor R is equal to the first grounding resistor RL1 and the second grounding resistor RR1). By using the same resistance design for the first grounding resistor RL1 and the second grounding resistor RR1 connected to the same clock signal line CLK, it is beneficial to reduce manufacturing complexity, and improve yield and productivity.

In some embodiments, considering that the same clock signal line CLK may have process differences and wiring differences on both sides of the display device 10 (including in the circuit board and the display panel), the first grounding resistor RL1 and the second grounding resistor RR1 of the grounding resistor R connected to the same clock signal line CLK can be designed differently. This design can effectively improve the load difference of the same clock signal line on different sides of the display device.

Figure 4:
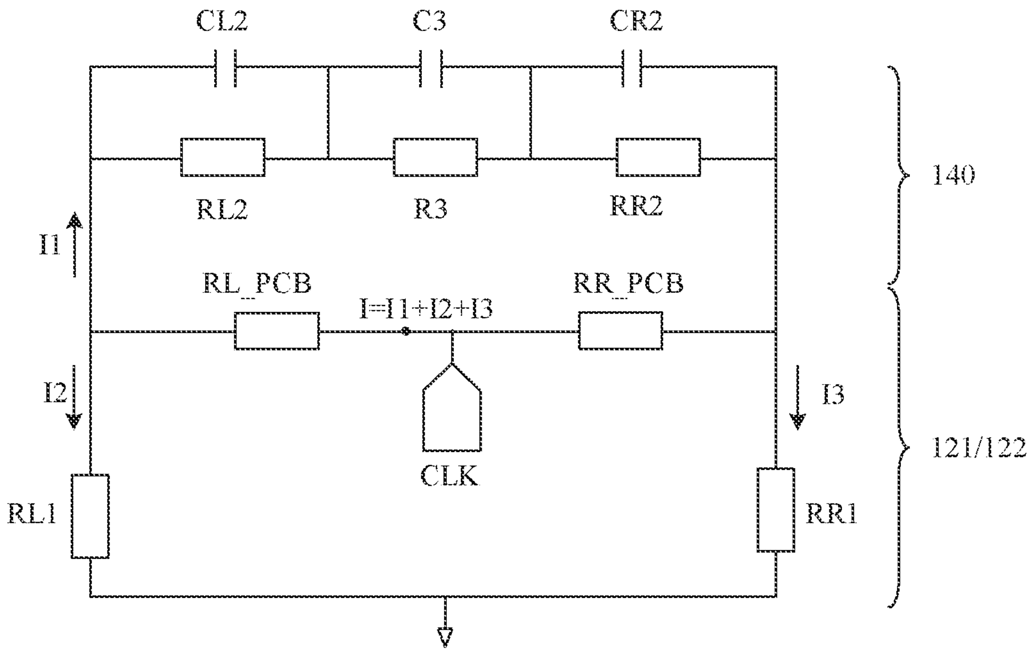
FIG. 4 shows a circuit diagram of a clock signal line according to an embodiment of the present disclosure.

As shown in FIG. 2 and FIG. 4, the display device 10 also includes a plurality of matching resistors R_PCB, which is disposed on the circuit board 121/122, and each matching resistor R_PCB is connected in series with the first section of the corresponding clock signal line CLK. Specifically, the matching resistor R_PCB connected to the same clock signal line CLK includes a first matching resistor RL_PCB and a second matching resistor RR_PCB. The first matching resistor RL_PCB is disposed on the first circuit board 121 and connected to the first subsection 161 of the clock signal line CLK. The second matching resistor RR_PCB is disposed on the second circuit board 122 and connected to the second subsection 162 of the clock signal line CLK.

In the manufacturing process of the display device 10, the grounding resistor R is set first, and then the matching resistor R_PCB is set. Specifically, a lighting test is performed on the display device 10 to confirm the image quality. If horizontal dense lines appear in the screen, all the clock signals are detected to determine the load difference between the clock signal lines. Then, through the above-mentioned design solution of the grounding resistor R, the voltage value corresponding to the high level of the clock signal is reduced. Therefore, the load difference between clock signal lines is eliminated, thereby eliminating black and white horizontal lines and improving display quality. Then, a resistance of the clock signal line CLK on the circuit board 121/122 is referenced to find the clock signal line CLK causing the dark line, and a series resistance matching is performed on the clock signal line CLK. Therefore, the matching resistor R_PCB can further solve the problem of black and white horizontal lines. It can be seen from the above that the setting of grounding resistors R and the matching resistors R_PCB can effectively reduce the charging difference of different clock signals of clock signal lines CLK to pixel rows, thereby improving the brightness uniformity of each pixel row, eliminating the problem of black and white horizontal lines, and improving the image quality.

The above-mentioned embodiments are described with a display device adopting a dual gate driving technology. It should be understood that the present disclosure is also applicable to display devices using a single gate drive technology. The principle and design of grounding resistors and matching resistors are similar to those of the above-mentioned dual gate drive technology, and will not be repeated here.

In summary, the present disclosure optimizes the circuit design of the clock signal lines and eliminate the load difference of the clock signal lines by setting the grounding resistors and the matching resistors connected to the clock signal lines on the circuit board of the display device, thereby solving the problem of unexpected black and white horizontal lines shown on a display image, and a product yield and product quality are greatly improved.

The above is a detailed introduction to the display device of the embodiments of the present disclosure. Specific embodiments are used in this specification to illustrate the principles and implementations of the present disclosure. The descriptions of the above embodiments are only used to help understand the technical solutions and core ideas of the present disclosure. Those of ordinary skill in the art should understand that they can still modify the technical solutions described in the foregoing embodiments, or equivalently replace some of the technical features. However, these modifications or replacements do not cause the essence of the corresponding technical solutions to deviate from the scope of the technical solutions of the embodiments of the present disclosure.

What is claimed is:

1. A display device, comprising:

a processor configured to output driving signals and voltages;

a timing controller connected to the processor, and configured to generate control signals based on the driving signals;

a circuit board connected to the timing controller, and configured to generate initial clock signals according to the voltages and the control signals, wherein any one of the initial clock signals is a signal with high levels and low levels that occur alternatively;

a display panel connected to the circuit board, and comprising a display area and a non-display area;

a plurality of clock signal lines configured to transmit the initial clock signals, wherein each of the clock signal lines extends from the circuit board to the non-display area of the display panel;

a plurality of grounding resistors disposed on the circuit board, wherein each of the grounding resistors is connected to a corresponding clock signal line, and is configured to reduce a voltage value of the high level of the initial clock signal to obtain an adjusted clock signal;

a gate driver disposed in the non-display area of the display panel, connected to the clock signal lines, and configured to generate a gate signal according to the adjusted clock signal; and a gate line disposed in the display area of the display panel, connected to the gate driver, and configured to transmit the gate signal;

wherein the display device comprises a M-th clock signal line, a (M−1)th clock signal line, and a (M−2)th clock signal line arranged in sequence; and a value of a grounding resistor of the plurality of grounding resistors connected to the M-th clock signal line is R(M), a value of a grounding resistor of the plurality of grounding resistors connected to the (M−1)th clock signal line is R(M−1), and a value of a grounding resistor of the plurality of grounding resistors connected to the (M−2)th clock signal line is R(M−2), wherein $R(M)<R(M-1)<R(M-2)$ or $R(M)>R(M-1)>R(M-2)$.

2. The display device according to claim 1, wherein the plurality of clock signal lines are arranged in sequence from the display area of the display panel toward the non-display area, and values of two of the grounding resistors connected to two of the clock signal lines are different.

3. The display device according to claim 1, wherein the display device comprises a K-th clock signal line and a (K−1)th clock signal line which are adjacent to each other; and a value of a grounding resistor of the plurality of grounding resistors connected to the K-th clock signal line is R(K), and a value of a grounding resistor of the plurality of grounding resistors connected to the (K−1)th clock signal line is R(K−1), wherein R(K)=R(K−1), and K≠M.

4. The display device according to claim 1, further comprising a plurality of matching resistors disposed on the circuit board, wherein each of the matching resistors is connected to a corresponding clock signal line.

5. The display device according to claim 1, wherein each of the clock signal lines comprises a first section and a second section connected to the first section, the first section is disposed in the circuit board, and the second section is disposed in the non-display area of the display panel, and each of the grounding resistors is connected to the first section of the corresponding clock signal line.

6. The display device according to claim 5, wherein the circuit board comprises a first circuit board and a second circuit board;

the first section of the clock signal line comprises a first subsection and a second subsection, the first subsection is disposed on the first circuit board, and the second subsection is disposed on the second circuit board;

the second section of the clock signal line comprises a third subsection and a fourth subsection, which are respectively arranged on opposite sides of the display panel;

the gate driver comprises a first gate driver and a second gate driver, the first gate driver is connected to the third subsection, the second gate driver is connected to the fourth subsection, and the first gate driver and the second gate driver are respectively connected to opposite ends of the gate line; and each of the grounding resistors comprises a first grounding resistor and a second grounding resistor, the first grounding resistor is disposed on the first circuit board and connected to the first subsection of the corresponding clock signal line, and the second grounding resistor is disposed on the second circuit board and connected to the second subsection of the corresponding clock signal line.

7. The display device according to claim 6, wherein the first grounding resistor and the second grounding resistor connected to a same clock signal line have a same value.

8. The display device according to claim 6, wherein the first grounding resistor and the second grounding resistor connected to a same clock signal line have different values.

9. The display device according to claim 6, wherein the clock signal line, RC circuits of the first grounding resistor and the second grounding resistor, and a RC circuit of a corresponding gate line constitute an electronic circuit.

10. A display device, comprising:

a circuit board configured to output clock signals, wherein any one of the initial clock signals is a signal with high levels and low levels that occur alternatively;

a display panel connected to the circuit board, and comprising a display area and a non-display area;

a plurality of clock signal lines configured to transmit the clock signals, wherein each of the clock signal lines extends from the circuit board to the non-display area of the display panel;

a plurality of grounding resistors disposed on the circuit board, wherein each of the grounding resistors is connected to a corresponding clock signal line, and is configured to reduce a voltage value of the high level of the clock signal;

a gate driver disposed in the non-display area of the display panel, connected to the clock signal lines, and configured to generate a gate signal according to the clock signal that the voltage value of the high level is reduced; and a gate line disposed in the display area of the display panel, connected to the gate driver, and configured to transmit the gate signal;

wherein the display device comprises a M-th clock signal line, a (M−1)th clock signal line, and a (M−2)th clock signal line arranged in sequence; and a value of a grounding resistor of the plurality of grounding resistors connected to the M-th clock signal line is R(M), a value of a grounding resistor of the plurality of grounding resistors connected to the (M−1)th clock signal line is R(M−1), and a value of a grounding resistor of the plurality of grounding resistors connected to the (M−2)th clock signal line is R(M−2), wherein $R(M)<R(M-1)<R(M-2)$ or $R(M)>R(M-1)>R(M-2)$.

11. The display device according to claim 10, wherein the plurality of clock signal lines are arranged in sequence from the display area of the display panel toward the non-display area, and values of two of the grounding resistors connected to two of the clock signal lines are different.

12. The display device according to claim 10, wherein the display device comprises a K-th clock signal line and a (K−1)th clock signal line which are adjacent to each other; and a value of a grounding resistor of the plurality of grounding resistors connected to the K-th clock signal line is R(K), and a value of a grounding resistor of the plurality of grounding resistors connected to the (K−1)th clock signal line is R(K−1), wherein R(K)=R(K−1), and K≠M.

13. The display device according to claim 10, further comprising a plurality of matching resistors disposed on the circuit board, wherein each of the matching resistors is connected to a corresponding clock signal line.

14. The display device according to claim 10, wherein each of the clock signal lines comprises a first section and a second section connected to the first section, the first section is disposed on the circuit board, and the second section is disposed on the non-display area of the display panel, and each of the grounding resistors is connected to the first section of the corresponding clock signal line.

15. The display device according to claim 14, wherein the circuit board comprises a first circuit board and a second circuit board;

the first section of the clock signal line comprises a first subsection and a second subsection, the first subsection is disposed on the first circuit board, and the second subsection is disposed on the second circuit board;

the second section of the clock signal line comprises a third subsection and a fourth subsection, which are respectively arranged on opposite sides of the display panel;

the gate driver comprises a first gate driver and a second gate driver, the first gate driver is connected to the third subsection, the second gate driver is connected to the fourth subsection, and the first gate driver and the second gate driver are respectively connected to opposite ends of the gate line; and each of the grounding resistors comprises a first grounding resistor and a second grounding resistor, the first grounding resistor is disposed on the first circuit board and connected to the first subsection of the corresponding clock signal line, and the second grounding resistor is disposed on the second circuit board and connected to the second subsection of the corresponding clock signal line.

16. The display device according to claim 15, wherein the first grounding resistor and the second grounding resistor connected to a same clock signal line have a same value.

17. The display device according to claim 15, wherein the first grounding resistor and the second grounding resistor connected to a same clock signal line have different values.

18. The display device according to claim 15, wherein the clock signal line, RC circuits of the first grounding resistor and the second grounding resistor, and a RC circuit of a corresponding gate line constitute an electronic circuit.

* * * * *